US008186463B2

(12) United States Patent
Hunziker et al.

(10) Patent No.: US 8,186,463 B2
(45) Date of Patent: May 29, 2012

(54) WHEELCHAIR WITH MIDDLE WHEEL DRIVE

(75) Inventors: Kurt Hunziker, Steffisburg (CH); Samuel Huerlimann, Gysenstein (CH); Alexandre Tapis, Aran s/Vilette (CH)

(73) Assignee: Degonda Rehab SA, Lausanne (CH)

( * ) Notice: Subject to any disclaimer, the term of this patent is extended or adjusted under 35 U.S.C. 154(b) by 694 days.

(21) Appl. No.: 11/922,904

(22) PCT Filed: Jun. 16, 2006

(86) PCT No.: PCT/CH2006/000331
§ 371 (c)(1), (2), (4) Date: Apr. 3, 2009

(87) PCT Pub. No.: WO2006/136046
PCT Pub. Date: Dec. 28, 2006

(65) Prior Publication Data
US 2009/0321162 A1 Dec. 31, 2009

(30) Foreign Application Priority Data
Jun. 24, 2005 (CH) ...................................... 1076/05

(51) Int. Cl.
*B60K 1/00* (2006.01)

(52) U.S. Cl. ..................... 180/65.1; 180/9.3; 280/250.1; 280/304.1

(58) Field of Classification Search ................. 180/65.1, 180/6.5, 12, 6.48, 218, 209, 907, 8.3, 9.3; 280/250.1, 755, 86.1, 304.1
See application file for complete search history.

(56) References Cited

U.S. PATENT DOCUMENTS 2,224,411 A * 12/1940 Smith .......................... 180/218
4,671,369 A 6/1987 Tiffin et al.
5,445,233 A * 8/1995 Fernie et al. .................. 180/6.5
5,842,532 A * 12/1998 Fox et al. ..................... 180/6.48
5,904,214 A 5/1999 Lin
5,964,473 A * 10/1999 Degonda et al. ........... 280/250.1
6,129,165 A 10/2000 Schaffner et al.
6,209,670 B1 * 4/2001 Fernie et al. .................... 180/12
6,601,863 B1 * 8/2003 Mentessi et al. ........... 280/304.1
6,640,916 B2 * 11/2003 Schaffner et al. ............ 180/65.1
6,712,369 B2 3/2004 Wu
6,752,230 B1 * 6/2004 Huang .......................... 180/209
7,055,835 B2 * 6/2006 Wu .............................. 280/86.1
7,104,346 B2 * 9/2006 Schaffner ..................... 180/65.1
7,562,728 B1 * 7/2009 Voigt ........................... 180/65.1
7,726,689 B2 * 6/2010 Mulhern et al. .............. 280/755
7,931,300 B2 * 4/2011 Mulhern et al. .............. 280/755
2003/0159862 A1 8/2003 Wu

FOREIGN PATENT DOCUMENTS

DE 21 65 452 7/1973
EP 1 584 312 10/2005
WO WO 96/15752 5/1996

* cited by examiner

*Primary Examiner* — Hau Phan
(74) *Attorney, Agent, or Firm* — Morriss O'Bryant Compagni, PC

(57) ABSTRACT

A wheelchair has two central wheels that can be separately driven by a motor. In order to allow the wheelchair to turn around in narrow spaces, the central wheels can be driven in opposite directions of rotation. When the wheelchair is turned around, the front wheels and rear wheels do not constitute a hindrance because they are kept at a distance from the ground by the swiveling wheel. All three wheels are coupled together on each side by a chain. When the front wheels run against an obstacle, the wheelchair climbs over the obstacle with the driven front wheels. This causes the fork of the swiveling wheel to swivel about the rotational axis in the direction of arrow, against the force of a spring, bringing the rear wheels in contact with the ground and also driving the wheelchair's rear wheels. This all-wheel drive allows the wheelchair to overcome relatively high obstacles both forwards and backwards, even when driving slowly and without losing its maneuverability.

37 Claims, 9 Drawing Sheets

WHEELCHAIR WITH MIDDLE WHEEL DRIVE

CROSS-REFERENCE TO RELATED APPLICATIONS

This application claims priority to International Application PCT/CH2006/000331 filed Jun. 16, 2006 and Swiss Patent Application No. 1076/05 filed on Jun. 24, 2005, the entirety of which is incorporated by reference.

BACKGROUND

1. Field of the Invention

The invention refers to a wheelchair with middle wheel drive, the wheelchair comprising two middle wheels separately drivable by motoric power, at least one front wheel and at least one rear wheel, the rear wheel or the front wheel being located at an elevated position above the plane of motion. The term wheelchair employed in this description is understood in the general sense of motor driven vehicles for handicapped persons.

2. The Related Art

U.S. Pat. No. 5,904,214, for example, discloses a wheelchair with middle wheel drive comprising two middle wheels, two front wheels in the form of castors, and a rear wheel which can be driven by a motor and is located at a position above the plane of motion. Each of the middle wheels is separately driven by a motor. This has the advantage that the wheelchair can be turned in narrow spaces, e.g. in an elevator cabin. To turn on the spot the operator actuates the controls to have the middle wheels turning in opposite directions to each other. The front wheels should not impede turning. Therefore, the front wheels are in form of swiveling wheels or castors. This wheelchair has the disadvantage that obstacles, if they exceed a certain height cannot be surmounted at slow speed. Further, the described wheelchair has little road grip on a snow covered ground and therefore is not anymore in a position to move up a ramp which has a relatively high gradient.

U.S. Pat. No. 6,712,369 describes a wheelchair with two middle wheels, two swiveling front wheels and two rear wheels. To drive the middle wheels a single motor is provided, but it is mentioned in the specification that further suitable driving means may be employed. The rear wheels have no driving means, are not swivelable and are not in contact with the plane floor. However, they can be moved upward against the force of springs. In contrast to the previously described wheelchair the rear wheels have no motoric drive. The wheelchair according the U.S. Pat. No. 6,712,369 is not capable to surmount at slow speed relatively high obstacles. With some skill such obstacles can be surmounted. If the wheelchair is strongly accelerated the springs of the rear wheels will be pressed together and the front wheels will be lifted so that they can surmount also a relatively high obstacle. However, most users of wheelchairs have an uncomfortable feeling in making such maneuvers. Some users of wheelchairs may even not dare such maneuvers, because they could be injured by the occurring shakes and jolts. It is further of disadvantage that on bad Toad conditions, e.g. because of snow, maneuverability of the wheelchair leaves much to be desired, because it has only two driven wheels.

In WO 96/15752 it was suggested on page 15, line 10 with reference to FIG. 14 to locate the front wheels at an elevated position, that is without contact to the floor, as also suggested later on in U.S. Pat. No. 6,129,165. This facilitates surmounting of an obstacle. This is not possible on driving backward, because only the front wheels are at an elevated position.

It is therefore an advantage of the present invention to create a wheelchair with middle wheel drive being capable, both on driving forward and backward, of surmounting relatively high obstacles even at relatively low speed. Also e.g. on snow covered pavement it should have a good driving behavior. Nevertheless, it should have the advantages of the middle wheel drive, in particular the capability to turn around in narrow spaces.

SUMMARY OF THE INVENTION

According to the invention this obtained in that the rear wheel and/or the front wheel can be driven by motoric power, in that a castor is located near the rear wheel and/or the front wheel to keep the rear wheel and/or the front wheel at an elevated position above the plane of motion, but is adjustable in height to permit the rear wheel or the front wheel to contact the ground when an obstacle is to be surmounted. Because normally neither the front wheel nor the rear wheel is in contact with the ground they are not obstructing turning the wheelchair. Thanks to its elevated position the front wheel, when hitting an obstacle, can easily surmount it. The same is true for the rear wheel on a backward movement. There is also no necessity to have these wheels in the form of castors. Therefore they can be driven wheels to give the wheelchair the properties of an all-wheel-drive in surmounting obstacles on snow covered ground. Preferably, the front wheel and the rear wheel are drivable by motoric power. To increase the stability and the road behavior it is advisable to provide a front wheel on each side of the wheelchair. For the same reason it is also of advantage to provide a rear wheel on each side of the wheelchair. A middle wheel, a front wheel and/or a rear wheel with a common drive can be provided on each side of the wheelchair. A common drive may be provided by an endless chain, an endless toothed belt, a gear train, a cardan drive or any other mechanical drive. A common drive could also be provided by hydraulic means.

The castor is preferably kept by the force of an spring in the normal position in which the front wheel and the rear wheel are located above the moving plane in which they are not impeding turning of the wheelchair. It would also be possible to provide a motor to adjust the elevation of the castor.

The respective castor is preferably located in the middle between the rear wheels or the front wheels, respectively.

The invention also refers to a wheelchair with a middle wheel drive, said wheelchair comprising two middle wheels separately drivable by motoric power, at least one front wheel and at least one rear wheel, the front wheel being located at an elevated position above the plane of motion. According to the invention this wheelchair is characterized in that the front wheel is drivable by motoric power and in that the rear wheel is a castor. Thanks to the rear wheels in the form of castors this wheelchair can also be turned in narrow spaces. It is easy to surmount obstacles in moving forward because of the elevated position of the front wheels above the moving plane and the motoric drive of the front wheels. If also substantially easier surmounting of obstacles on moving backward is desired, it is advisable, as described before, to provide a motoric drive for all wheels.

BRIEF DESCRIPTION OF THE DRAWINGS

Embodiments of the invention will now be described with reference to the drawing.

DETAILED DESCRIPTION OF THE INVENTION

Figure 1:
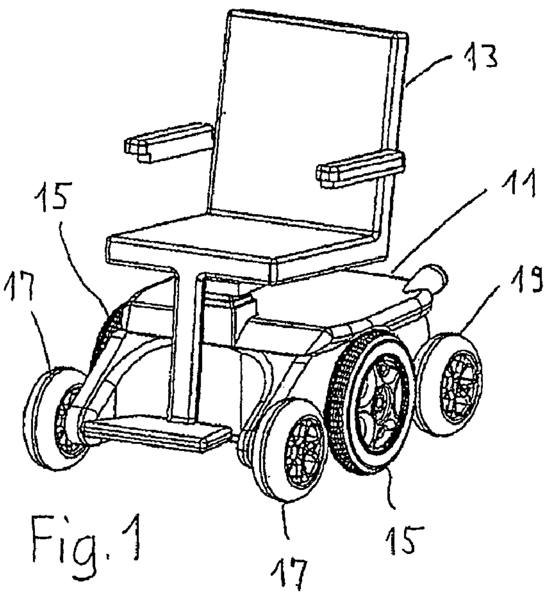
FIG. 1 shows a schematical representation of a first embodiment of a wheelchair with middle wheel drive
Figure 2:
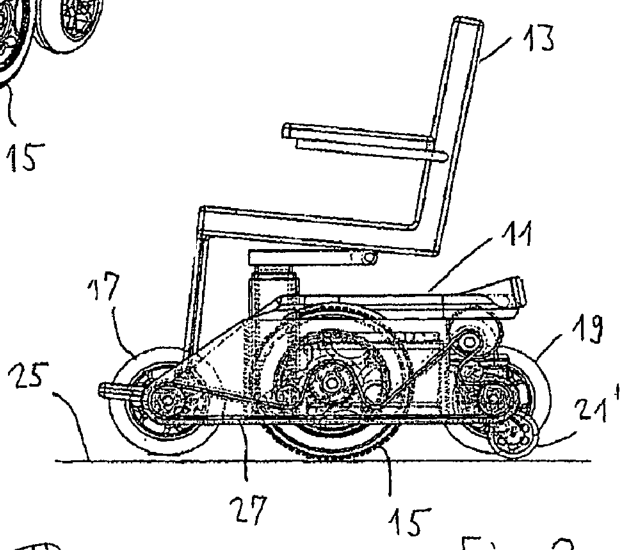
FIG. 2 shows a side elevation of the wheelchair according to FIG. 1.
Figure 3:
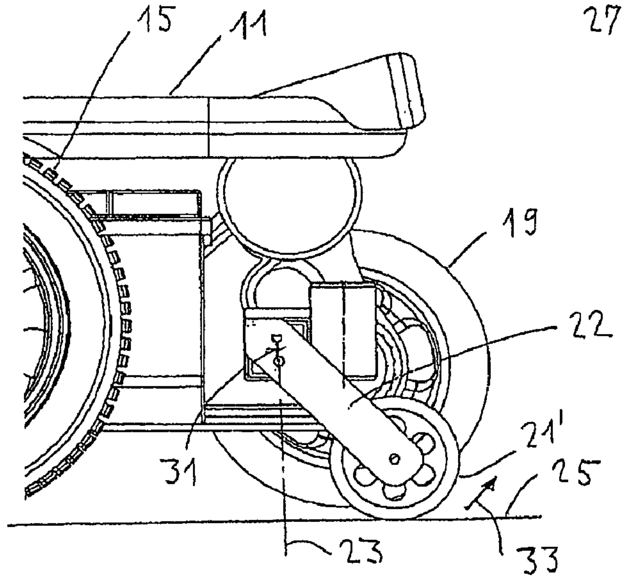
FIG. 3 shows a side elevation of the castor located between the rear wheels of the wheelchair
Figure 12:
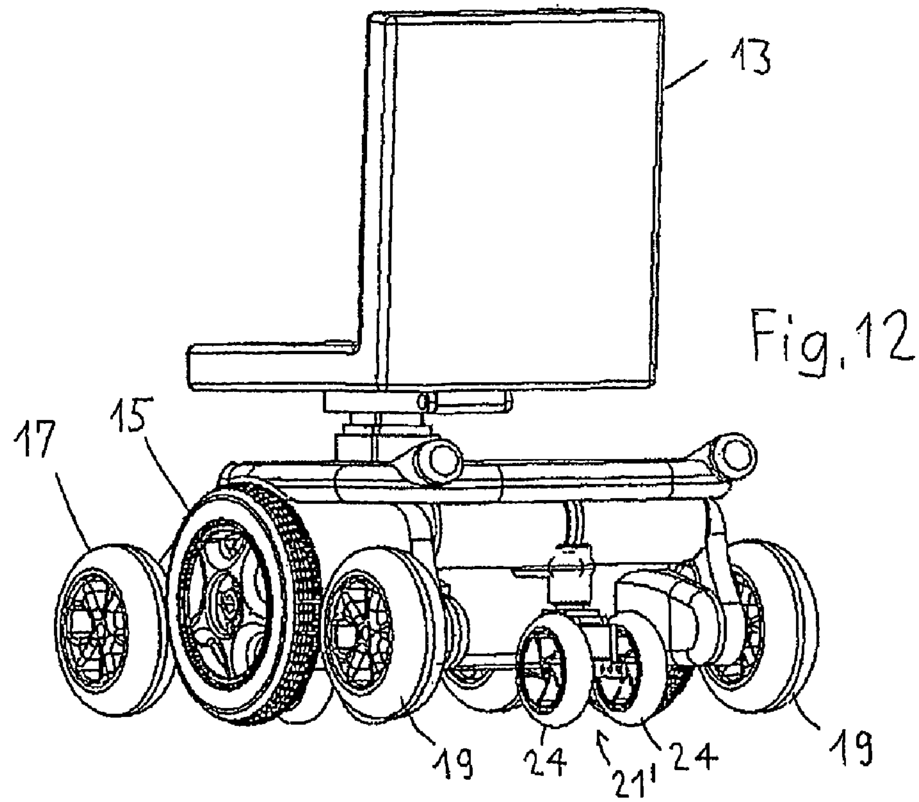
FIG. 12 shows a perspective rear view of the wheelchair of FIG. 10.
Figure 13:
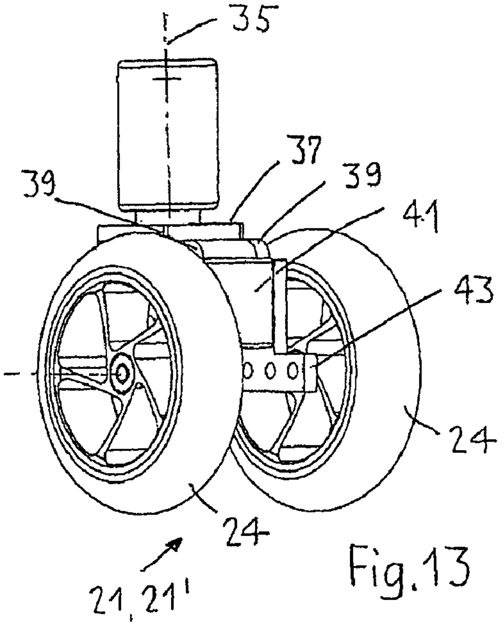
FIG. 13 shows a castor with twin wheels and spring suspension by means of a spring articulation.
Figure 14:
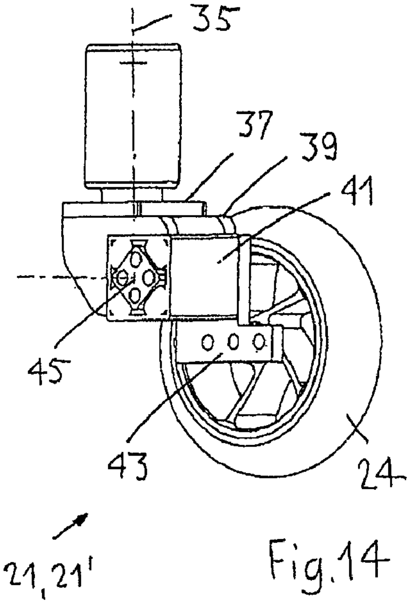
FIG. 14 shows the castor of FIG. 13 with one of the twin wheels omitted to show the spring articulation.

The wheelchair according to the FIG. 1 to 3 comprises a chassis 11 and a seat 13 mounted thereon. The seat may have any configuration, e.g. the configuration of a raising frame, to enable the user to move from a sitting position to a standing position. The wheelchair has two middle wheels 15, two front wheels 17 and two rear wheels 19. It would also be possible to have for instance only one rear wheel 19 in a central position. As FIGS. 2 and 3 show, a castor 21' is located between the rear wheels 19. The castor 21' has preferably the form of a spring-mounted twin wheel (FIG. 12. to 15).

Each of the two middle wheels 15 can separately be driven by a motor (not shown). This enables to turn the wheelchair in narrow spaces by having one middle wheel 15 driven in one direction and the other middle wheel 15 driven in the opposite direction. On this turning the castor 21' can swivel around the vertical axis 23 (FIG. 3). It should be noted that the castor 21' keeps the rear wheels 19 as well as the front wheels 17 at a elevated position above the plane of motion 25. Accordingly, if the floor is level, only the middle wheels 15 and the castor 21' are in contact with the floor. Therefore, the front wheels and the rear wheels will not impede turning. The wheels 15, 17, 19 on one side of the wheelchair have a common drive. For this purpose they are coupled by a chain 27 or a chain belt and corresponding chain wheels (not visible). In the same way a chain 27 or a chain belt serves to drive the wheels 15, 17, 19 on the other side of the wheelchair. Therefore, two motors are sufficient to drive all wheels. However, it would also be possible to drive each the pair of front wheels 17 and rear wheels 19 by a separate motor.

Figure 4:
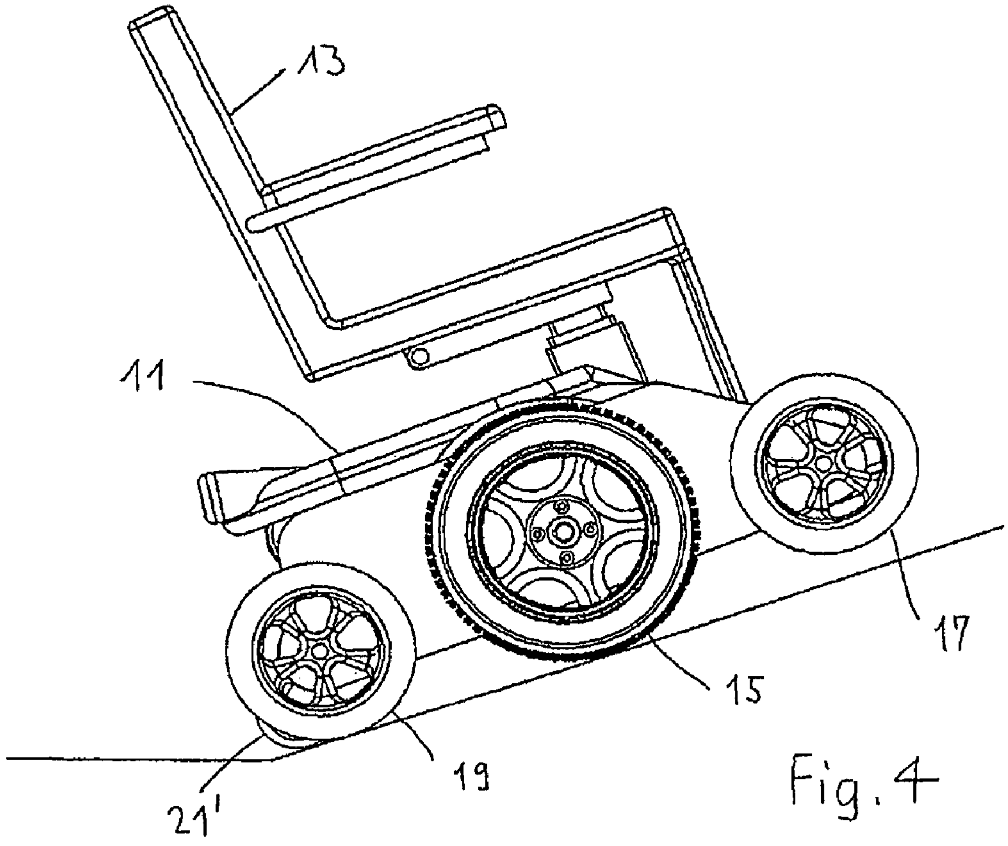
FIG. 4 shows the wheelchair moving upstreet

It is of importance that the castor 21, which normally keeps the front wheels as well as the rear wheels at an elevated position above the plane of motion 25 to permit turning on narrow spaces, can be elevated. Accordingly, if the castor 21' is elevated, the rear wheels 19 will contact the floor. Elevating the castor 21' seen in FIG. 3 can take place in different ways, For example, a motoric drive may be provided. On the embodiment shown the castor 21' is kept by spring force in the position shown. In surmounting an obstacle forces are created which move the fork 22 of the castor around the rotational axis 31 in direction of the arrow 33, so that the rear wheels 19 get into contact with the floor. This is also the case on an upstreet movement, as shown in FIG. 4. On an up street movement the contact pressure of the middle wheels 15 decreases. However, as now the rear wheels 19 have floor contact, the vehicle is driven by four wheels. Accordingly, the wheelchair has the advantages of a four-wheel-drive. On a snow covered or uneven terrain also the front wheel 17 may grip.

Figure 5:
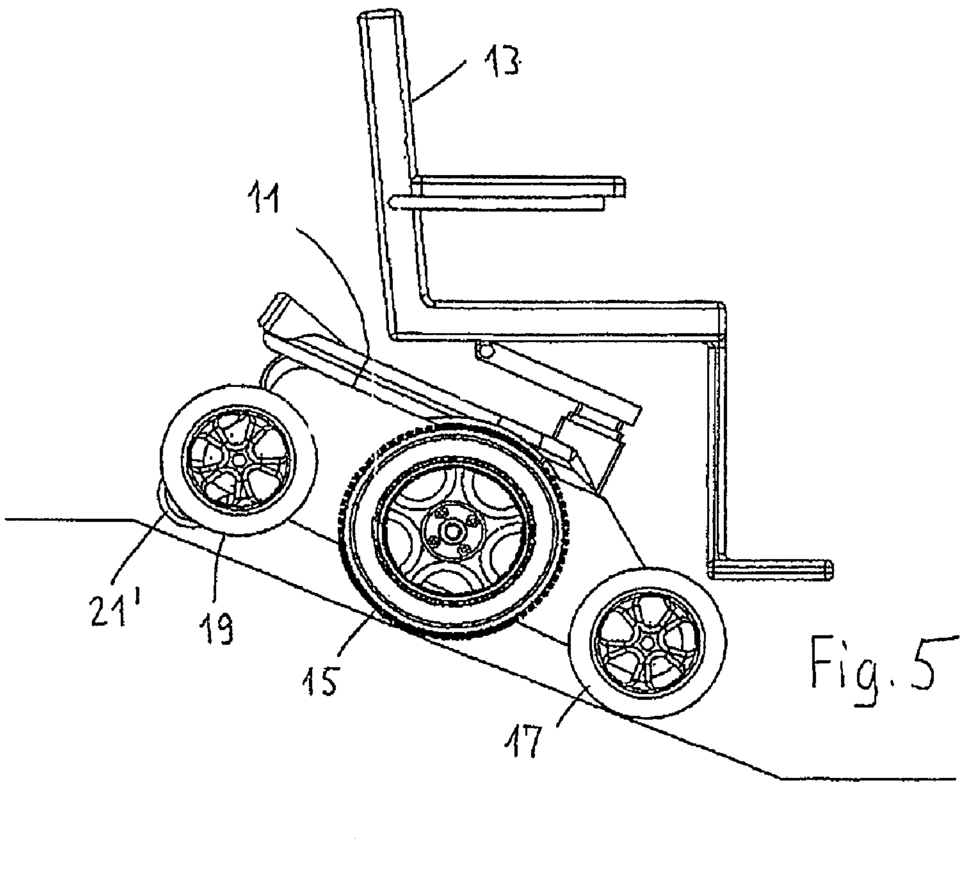
FIG. 5 shows a wheelchair moving downstreet

Moving downstreet the front wheels become loaded so they make ground contact (FIG. 5). Because also the front wheels are driven, the wheelchair has the advantages of the four-wheel-drive.

Figure 6:
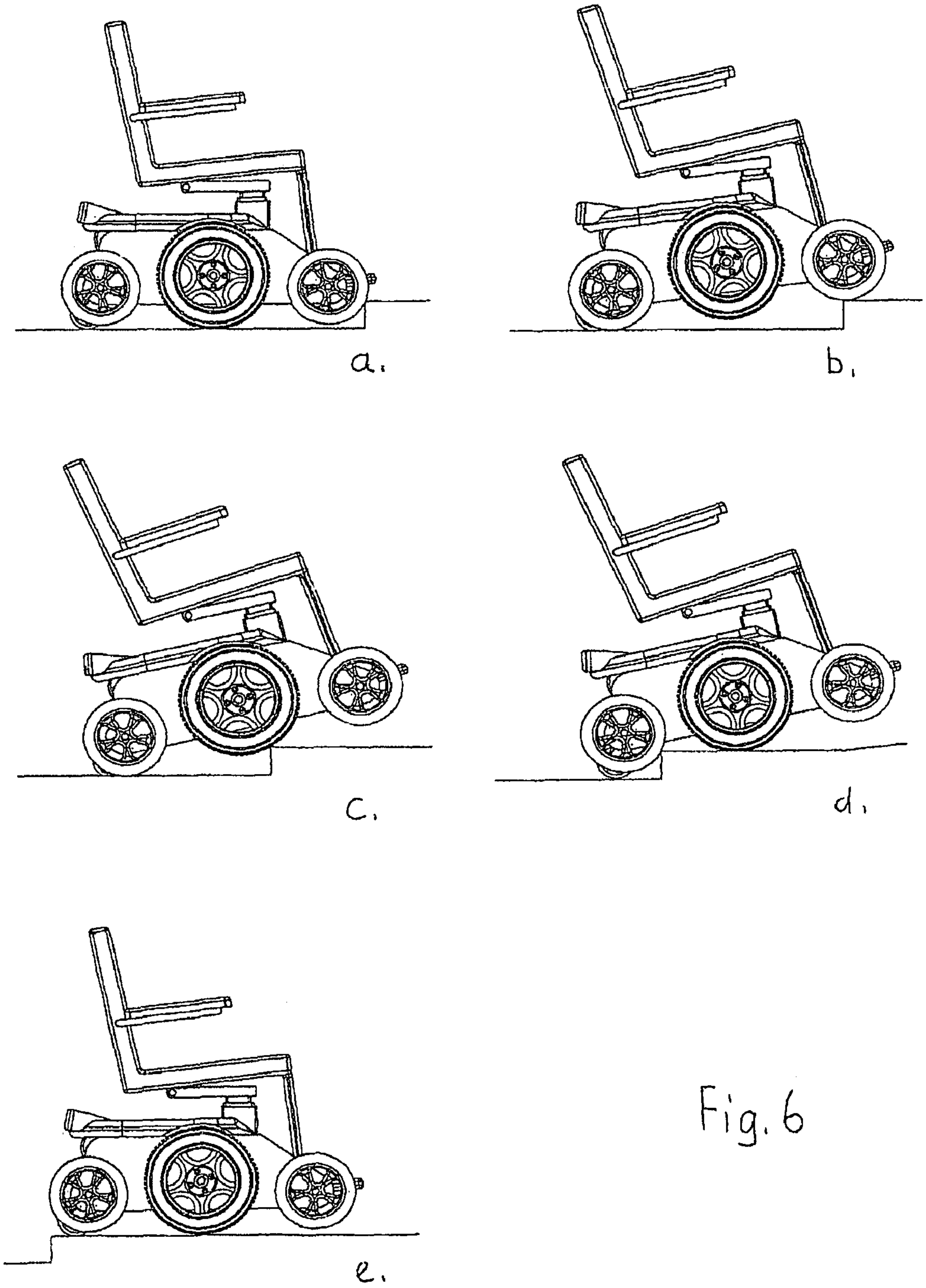
FIGS. 6*a*-6*e* shows different phases of moving forward over an obstacle

The wheelchair should not only be capable to turn on the spot and have good driving behavior, but it should also be in a position to surmount relatively large obstacles at relatively low speed. This capability is one of the advantages of the vehicle according to the invention. FIG. 6 shows the different phases of surmounting an obstacle on moving forward.

a) The vehicle with a driven front wheel, which is normally somewhat elevated from the ground, moves to the edge of the obstacle.

b) The vehicle climbs with its driven front wheels on the obstacle. The rear wheels contact the ground and move the vehicle forward, even if the middle wheels get out of contact with the ground.

c) The vehicle climbs with a driven middle wheels on the obstacle.

d) The vehicle is now moved forward both with the middle wheels and the rear wheels, the rear wheels climbing over the obstacle.

e) The vehicle has surmounted the obstacle.

Figure 7:
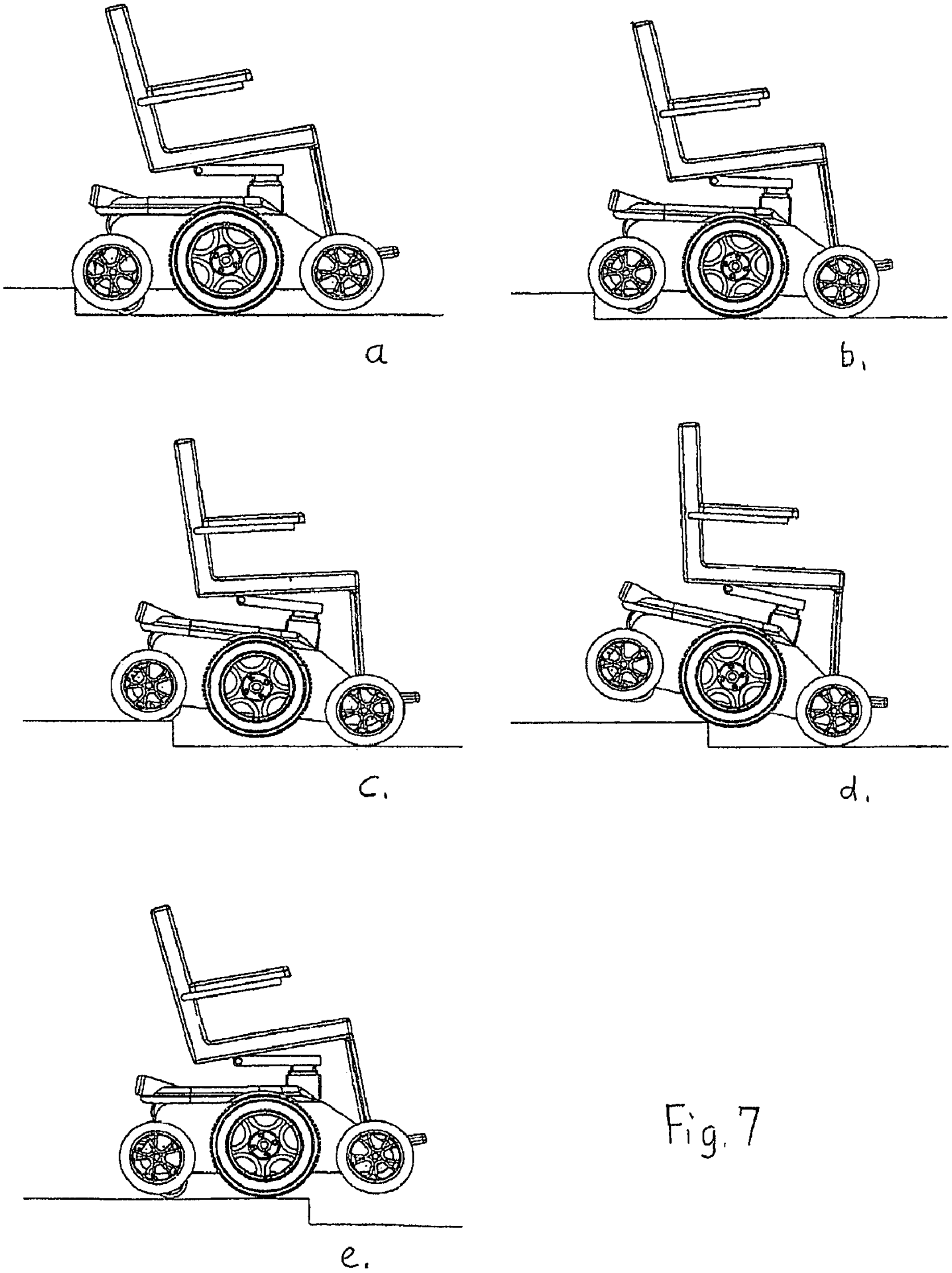
FIGS. 7*a*-7*e* shows different phases of moving backward over an obstacle.

In FIG. 7 surmounting the obstacle on moving backward is shown. The phases are the same as previously described with reference to FIG. 6, but with the functions of the front wheels and the rear wheels being interchanged.

Figure 8A:
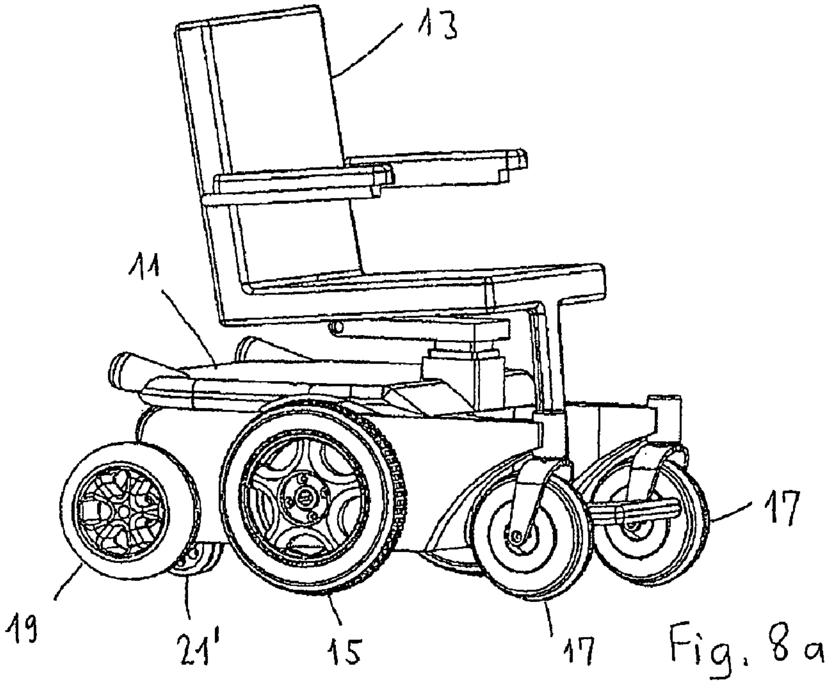
FIGS. 8*a*-8*c* shows a second embodiment of a wheelchair with middle wheel drive where only the middle wheels and the rear wheels drivable by motoric power.
Figure 8B:
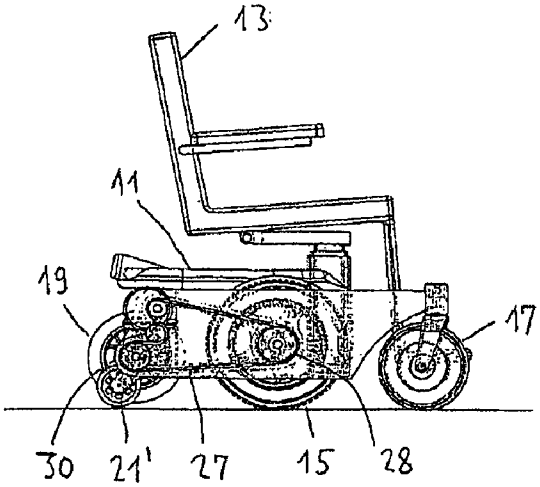
Figure 8C:
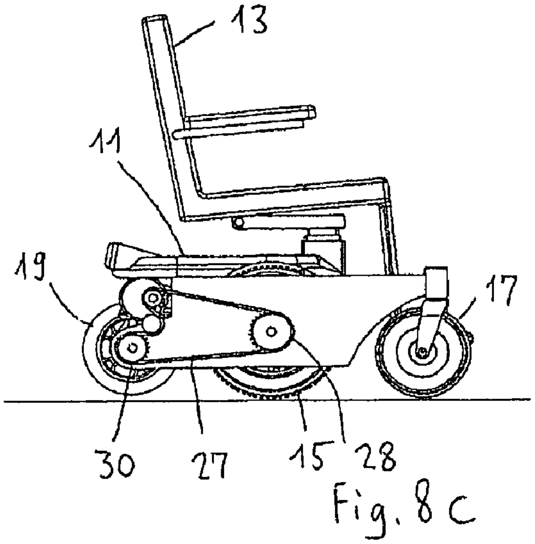
Figure 9A:
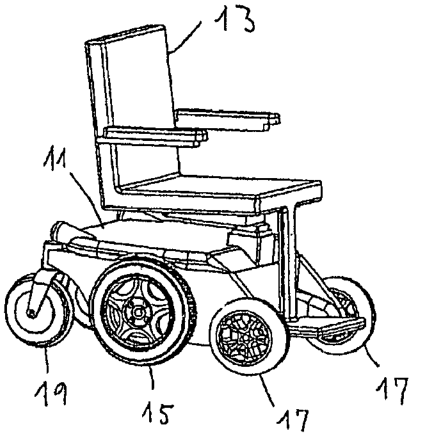
FIGS. 9*a*-9*d* shows a third embodiment of a wheelchair where only the middle wheels and the front wheels are drivable by motoric power.
Figure 9B:
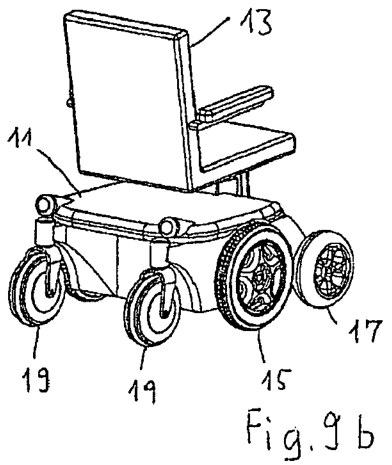
Figure 9C:
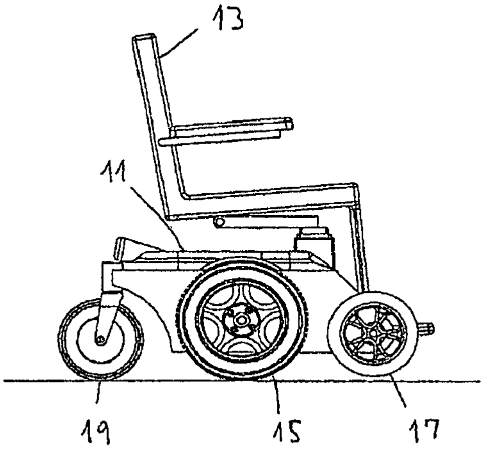
Figure 9D:
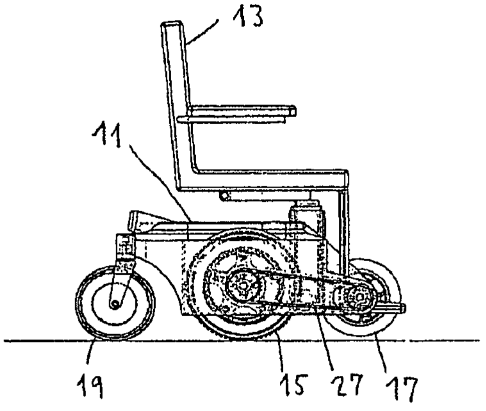

The wheelchair according to the embodiment of the FIGS. 8*a* to *c* is substantially the same as the wheelchair in FIGS. 1 to 3, but has no motoric drive for the front wheels 17. Accordingly, on one side of the wheelchair only the middle wheels and the rear wheel 19 are coupled together by means of a chain and corresponding chain wheels 28, 30. The same is also true of the wheels 15, 19 and the chain wheels 28,30 on the other side of the wheelchair. On the embodiment shown the front wheels 17 are castors. The front wheels could also be non-tiltable as shown in FIG. 1, but in this case they would have to be located above the plane of motion to permit turning of the wheelchair on narrow spaces.

Also the wheelchair according to FIGS. 9*a* to *d* is of substantially of the same construction as the wheelchair in the FIGS. 1 to 3, but instead of a motoric drive for the rear wheels 19 it has a motoric drive for the front wheels 17. The rear wheels 19 are castors to permit turning on narrow spaces. The castors 17 are preferably spring suspended. Instead of providing two castors it would also be possible to provide only one. For the same purpose it would also be possible to maintain the construction according to FIGS. 1 to 3 with non-tiltable rear wheels 19 with a castor 21'.

Figure 10:
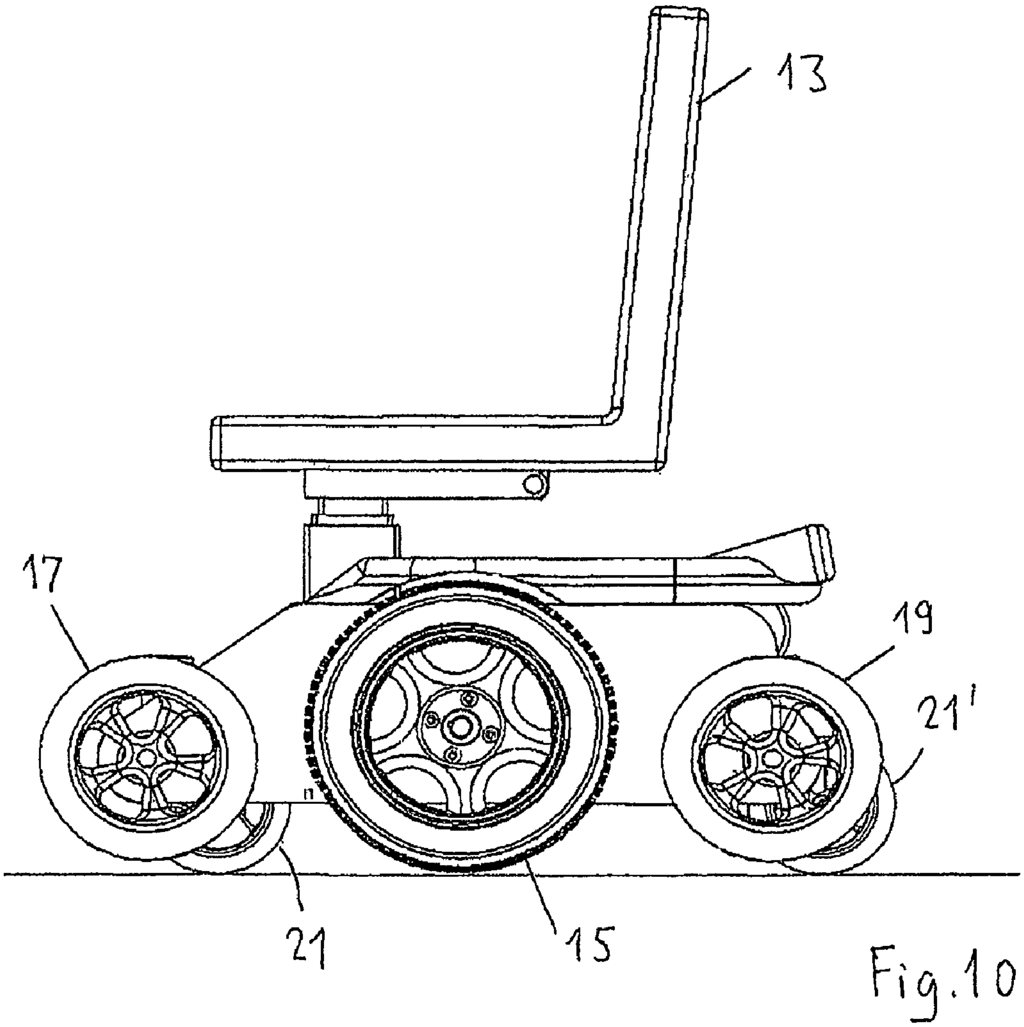
FIG. 10 shows a forth embodiment of a wheelchair with middle wheel drive and a castor at the front and at the back
Figure 11:
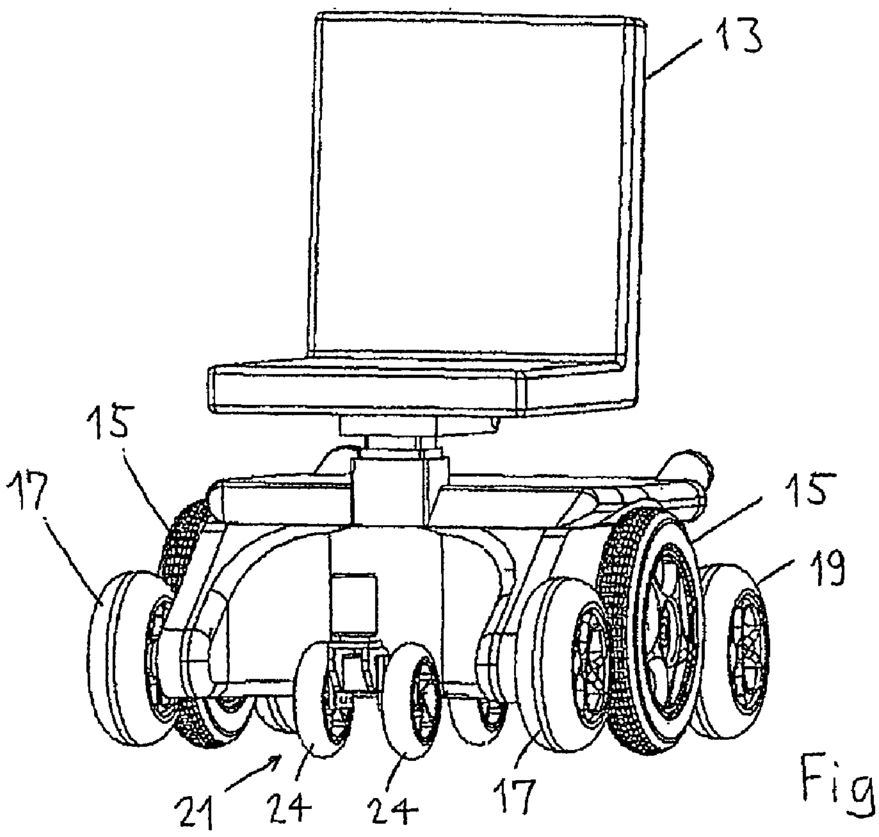
FIG. 11 shows a perspective front view of the wheelchair of FIG. 10

Like the wheelchair according to FIGS. 1 to 3 the wheelchair according to the FIGS. 10 to 12 has a spring suspended castor 21' at the rear, but it has additionally also at the front a spring suspended castor 21. In this way it is prevented that on normal travel the rear wheels 19 and the front wheels 17 alternatingly make contact with the ground, thereby causing see-sawing which is unpleasant for the user. The spring suspension of the castors 21, 21' must be adapted to the weight of the user, so that on moving over obstacles, ramps, or the like the driven front wheels 17 or rear wheels 19 will be in contact with the ground. The castors 21, 21' preferably have an abutment, so they can not yield contrary to the direction of travel.

As shown in FIGS. 10 to 15 the castors 21, 21' are preferably in the form of twin wheels. This has the advantage that it facilitates turning. This is appreciated by the users of the wheelchair. Such twin wheels are also of advantage in surmounting an obstacle, because on contacting an obstacle with one of the wheels 24 a tilting takes place, so that both wheels 24 surmount the obstacle together. In this way the danger of ripping off the tire is avoided.

The castors 21, 21' can tilt around a vertical axis 35. The support 37 has two arms 39. Between them is a articulation, e.g. a spring articulation 41 of the type "ROSTA"™. On each side of the spring articulation 41 is an arm 43 having at its free end the wheel 24. The arms 43 are tiltable against the force of the spring articulation 41 around the horizontal axis 45.

Figure 15:
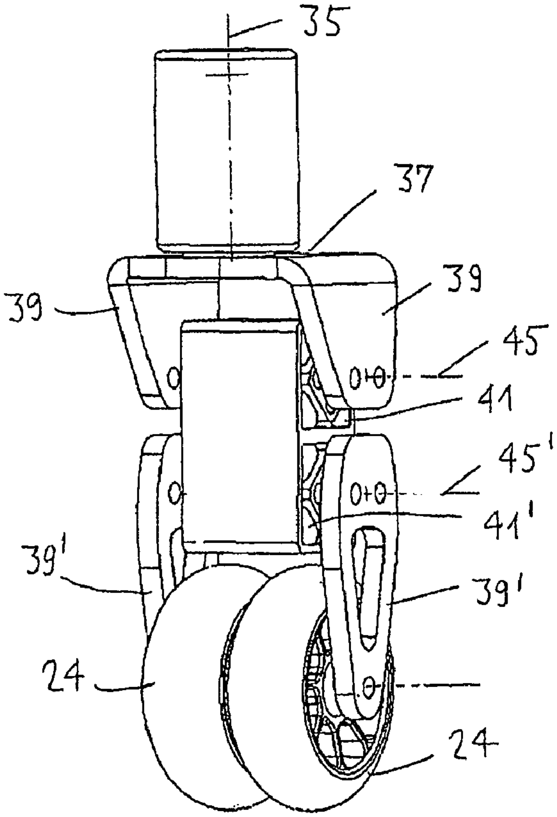
FIG. 15 shows a further embodiment of a castor on which two spring articulations are provided to permit a larger deflection.

In FIG. 15 a further embodiment of a castor 21, 21' is shown having two spring articulations 41, 41'. The castor is tiltable around the vertical axis 35. The support 37 has two arms 39. Between these arms the first spring articulation 41, e.g. of the type "ROSTA"™ is located. This spring articulation 41 is connected with a second spring articulation 41'. On both sides of this second spring articulation an arm 39' is provided. The arm 39' carries the wheels 24. These wheels 24 are located between the two arms 39', but it would be possible to have the wheels 24 also located outside of the arms 39'. This castor has two horizontal axis 45, 45' and therefore provides a larger spring excursion.

Summarizing, the following can be stated: The wheelchair has two middle wheels 15 which can be separately driven by a motor. In order to allow the wheelchair to turn around in narrow spaces, the middle wheels 15 can be driven in opposite directions of rotation. When the wheelchair is turned around, the front wheels 17 and the rear wheels 19 do not constitute a hindrance because they are kept at a distance from the ground by the castor 21. All three wheels 15, 17 and 19 are coupled together on each side by a chain 27. When the front wheels run against an obstacle, the wheelchair climbs over the obstacle with the driven front wheels 17. This causes the fork 22 of the castor 21 to swivel about the rotational axis 31 in the direction of arrow 33 against the force of a spring, bringing the rear Wheels in contact with the ground and also driving the wheelchair's rear wheels. This all-wheel drive allows the wheelchair to overcome relatively high obstacles both forward and backward, even when driving slowly and without losing its maneuverability (FIGS. 1 and 3).

The invention claimed is:

1. A wheelchair with middle wheel drive, said wheelchair comprising:

two middle wheels separably driven by motor power;

at least one front wheel and at least one rear wheel, at least the rear wheel or the front wheel being located at an elevated position above the plane of motion, and driven by motor power; and a castor located near the at least one rear wheel at the elevated position or the at least one front wheel at the elevated position to keep at least one of the at least one rear wheel and the at least one front wheel in the elevated position above the plane of motion, the castor being adjustable in height to permit the rear wheel at the elevated position or the front wheel at the elevated position to contact the ground when an obstacle is to be surmounted.

2. The wheelchair according to claim 1, wherein both the at least one front wheel at the elevated position and the at least one rear wheel at the elevated position are driven by motoric power.

3. The wheelchair according to claim 1, wherein the at least one front wheel includes a front wheel provided on each side of the wheelchair.

4. The wheelchair according to claim 3, wherein the at least one rear wheel includes a rear wheel on each side of the wheelchair.

5. The wheelchair according to claim 4, wherein the castor is located in the middle between the rear wheels or the front wheels, respectively.

6. The wheelchair according to claim 1, wherein one of the two middle wheels, the at least one front wheel at the elevated position or the at least one rear wheel at the elevated position is provided on each side of the wheel chair, and further including a common drive provided for at least the two middle wheels and at least one of the at least one front wheel at the elevated position and the at least one rear wheel at the elevated position.

7. The wheelchair according to claim 6, further comprising gears coupled by an endless chain, an endless toothed belt, a gear train, a cardan drive or another mechanical drive.

8. The wheelchair according to claim 1, wherein the castor is kept by spring force in the normal position in which the at least one front wheel at the elevated position or the at least one rear wheel at the elevated position are in a position above the plane of motion.

9. The wheelchair according to claim 8, wherein the castor is kept by a motor in the normal position.

10. The wheelchair according to claim 1 wherein on each side of the wheelchair at least one front wheel is provided, and wherein the front wheels are castors.

11. A wheelchair with middle wheel drive, said wheel chair comprising:

two middle wheels separately driven by motor power; and at least one front wheel and at least one rear wheel, the front wheel being located at an elevated position above the plane of motion, the front wheel driven by motor power and the rear wheel comprising a castor.

12. The wheelchair according to claim 11, wherein the rear wheel is a spring suspended castor.

13. The wheelchair according to claim 12, wherein the castor is a twin castor.

14. The wheelchair according to claim 12, wherein the castor has at least one spring articulation.

15. The wheelchair according to claim 14, wherein the castor has two spring articulations.

16. The wheelchair according to claim 11, wherein the at least one front wheel includes a front wheel provided on each side of the wheel chair.

17. The wheelchair according to claim 11 wherein the at least one rear wheel includes a rear wheel provided on each side of the wheel chair.

18. The wheelchair according to claim 11, further comprising a common drive for the two middle wheels and the at least one front wheel.

19. The wheelchair according to claim 18, further comprising gears coupled by an endless chain, an endless toothed belt, a gear train, a cardan drive or another mechanical drive.

20. A wheelchair with middle wheel drive, said wheelchair comprising:

two middle wheels separably driven by motor power;

at least one front wheel and at least one rear wheel, at least the rear wheel or the front wheel being located at an elevated position above the plane of motion, and driven by motor power;

a castor located near the at least one rear wheel at the elevated position or the at least one front wheel at the elevated position to keep at least one of the at least one rear wheel and the at least one front wheel in the elevated position above the plane of motion, the castor being adjustable in height to permit the rear wheel at the elevated position or the front wheel at the elevated position to contact the ground when an obstacle is to be surmounted;

one of the two middle wheels, the at least one front wheel at the elevated position or the at least one rear wheel at the elevated position being provided on each side of the wheel chair; and a common drive, comprising gears coupled by an endless chain, an endless toothed belt, a gear train, a cardan drive or another mechanical drive, provided for at least the two middle wheels and at least one of the at least one front wheel at the elevated position and the at least one rear wheel at the elevated position.

21. The wheelchair according to claim 20, wherein the at least one front wheel includes a front wheel provided on each side of the wheelchair and the at least one rear wheel includes a rear wheel on each side of the wheelchair.

22. The wheelchair according to claim 21, wherein the castor is located in the middle between the rear wheels at the elevated position or the front wheels at the elevated position, respectively.

23. The wheelchair according to claim 20, wherein the castor is kept by one of spring force and a motor in the normal position in which the at least one front wheel at the elevated position or the at least one rear wheel at the elevated position are in a position above the plane of motion.

24. A wheelchair with middle wheel drive, said wheel chair comprising:

two middle wheels separably driven by motor power;

at least one front wheel and at least one rear wheel, the front wheel being located at an elevated position above the plane of motion, the front wheel driven by motor power and the rear wheel comprising a castor;

a common drive for the two middle wheels and the at least one front wheel comprising gears coupled by an endless chain, an endless toothed belt, a gear train, a cardan drive or another mechanical drive.

25. The wheelchair according to claim 24, wherein the rear wheel is a spring suspended castor having at least one spring articulation.

26. The wheelchair according to claim 24, wherein the at least one front wheel includes a front wheel provided on each side of the wheelchair and the at least one rear wheel includes a rear wheel on each side of the wheelchair.

27. The wheelchair according to claim 24, wherein the at least one front wheel includes a front wheel provided on each side of the wheelchair and the at least one rear wheel includes a rear wheel on each side of the wheelchair.

28. A wheelchair with middle wheel drive, said wheel chair comprising:

two middle wheels separately driven by motor power; and at least one front wheel and at least one rear wheel, the front wheel being located at an elevated position above the plane of motion, the front wheel driven by motor power and the rear wheel comprising a spring suspended castor.

29. The wheelchair according to claim 28, wherein the spring suspended castor has at least one spring articulation.

30. A wheelchair with middle wheel drive, said wheel chair comprising:

two middle wheels separately driven by motor power; and at least one front wheel and at least one rear wheel, the front wheel being located at an elevated position above the plane of motion, the front wheel driven by motor power, the rear wheel comprising a castor, and the at least one front wheel comprising a front wheel provided on each side of the wheel chair.

31. The wheelchair according to claim 30, wherein the at least one rear wheel is a spring suspended castor.

32. The wheelchair according to claim 31, wherein the spring suspended castor has at least one spring articulation.

33. The wheelchair according to claim 30, wherein at least one rear wheel includes a rear wheel on each side of the wheelchair.

34. A wheelchair with middle wheel drive, said wheel chair comprising:

two middle wheels separately driven by motor power;

at least one front wheel and at least one rear wheel, the front wheel being located at an elevated position above the plane of motion, the front wheel driven by motor power and the rear wheel comprising a castor; and a common drive for the two middle wheels and the at least one front wheel.

35. The wheelchair according to claim 34, wherein the rear wheel is a spring suspended castor having at least one spring articulation.

36. The wheelchair according to claim 34, wherein the at least one front wheel includes a front wheel provided on each side of the wheelchair and the at least one rear wheel includes a rear wheel on each side of the wheelchair.

37. The wheelchair according to claim 34, wherein said common drive comprises gears coupled by an endless chain, an endless toothed belt, a gear train, a cardan drive or another mechanical drive.

* * * * *